United States Patent [19]

Reimert et al.

[11] Patent Number: 5,503,660
[45] Date of Patent: Apr. 2, 1996

[54] PROCESS AND APPARATUS FOR SEPARATING SLAG DROPLETS FROM A HOT RAW GAS PRODUCED BY THE COMBUSTION OR GASIFICATION OF SOLID OR LIQUID FUELS

[75] Inventors: Rainer Reimert, Idstein; Karel Vydra, Bad Nauheim, both of Germany

[73] Assignee: Metallgesellschaft Aktiengesellschaft, Frankfurt, Germany

[21] Appl. No.: 252,518

[22] Filed: Jun. 1, 1994

[30] Foreign Application Priority Data

Jun. 3, 1993 [DE] Germany .......................... 43 18 385.9

[51] Int. Cl.$^6$ .................................................. B01D 50/00
[52] U.S. Cl. ......................... 95/268; 48/128; 48/DIG. 2; 55/318; 55/320; 55/322; 95/116; 95/274; 96/131
[58] Field of Search ............... 55/318, 320, 321, 55/323, 262, 322; 95/268, 271, 274, 287, 116, 118; 96/131, 133, 139, 132; 48/87, 128, DIG. 2

[56] References Cited

U.S. PATENT DOCUMENTS

| 1,936,078 | 11/1933 | Adamson | 95/274 |
|---|---|---|---|
| 2,121,733 | 6/1938 | Cottrell | 48/128 |
| 4,015,959 | 4/1977 | Grote | 55/318 |
| 4,054,424 | 10/1977 | Staudinger et al. | 55/261 |
| 4,306,995 | 12/1981 | Baillie | 95/271 |
| 4,367,076 | 1/1983 | Paise et al. | 48/128 |
| 4,479,809 | 10/1984 | Johnson et al. | 55/261 |
| 4,482,358 | 11/1984 | Hsieh et al. | 48/77 |
| 4,487,618 | 12/1984 | Mann | 55/323 |
| 4,600,416 | 7/1986 | Mann | 55/323 |
| 4,671,806 | 6/1987 | Stil et al. | 95/268 |
| 4,865,629 | 9/1989 | Zievers et al. | 95/268 |
| 5,181,943 | 1/1993 | Weber | 95/268 |

FOREIGN PATENT DOCUMENTS

| 1194873 | 11/1959 | France . |
| 8623752 | 4/1986 | Germany . |
| 0358928 | 3/1990 | Germany . |

*Primary Examiner*—Jay H. Woo
*Assistant Examiner*—Duane S. Smith
*Attorney, Agent, or Firm*—Sprung Horn Kramer & Woods

[57] ABSTRACT

The hot raw gas, which contains slag droplets is conducted downwardly in an entrance chamber of a slag separator through a first bed of packings into a flow-deflecting space, in which the raw gas is upwardly deflected and then flows upwardly in an exit chamber through a second bed of packings to a gas outlet. The effective velocity of flow of the raw gas in the first bed is 1.5 to 10 times its effective velocity of flow in the second bed. Liquid slag is drained from the flow-deflecting space.

7 Claims, 2 Drawing Sheets

PROCESS AND APPARATUS FOR SEPARATING SLAG DROPLETS FROM A HOT RAW GAS PRODUCED BY THE COMBUSTION OR GASIFICATION OF SOLID OR LIQUID FUELS

BACKGROUND OF THE INVENTION

This invention relates to a process of separating slag droplets from a raw gas which has been produced by the combustion or gasification of solid or liquid fuels and is at temperatures in the range from 1100° to 1800° C. and under a pressure from 1 to 40 bars, and to an apparatus for carrying out that process.

The separation of droplets of liquid from gases at relatively low temperatures is known and has been described, e.g., in EP-A-0 408 533 and the corresponding U.S. Pat. No. 4,938,785. But the liquid which is thus separated does not consist of liquid slag, which will solidify at temperatures below about 1100° C.

SUMMARY OF THE INVENTION

It is an object of the invention to carry out the process described first hereinbefore in a simple manner and as economically as possible. This is accomplished in accordance with the invention in that the raw gas which contains the slag droplets flows downwardly in an entrance chamber of a slag separator through a first bed of packings into a flow-deflecting space, in which the raw gas is upwardly deflected, the raw gas then flows upwardly in an exit chamber of the slag separator through a second bed of packings to a gas outlet, the effective velocity of flow of the combustion gas in the first bed of packings is 1.5 to 10 times its effective velocity of flow in the second bed of packings, and liquid slag is drained from the flow-deflecting space.

In the process in accordance with the invention the surfaces of the packings in the entrance chamber are wetted by the slag droplets in the hot raw gas. The slag is drained downwardly and that drainage is promoted by the direction of flow of the gas. After the gas has been deflected it rises at a lower velocity past the surfaces of the packings in the exit chamber and residual and previously entrained slag droplets are separated therein. Owing to the reduced velocity of the gas the slag can drain in a countercurrent to the gas downwardly into the flow-deflecting space and as far as to the slag tap.

It is not necessary for the raw gas to flow exactly downwardly in the entrance chamber and exactly upwardly in the exit chamber. The angle through which the raw gas is deflected from its direction of flow in the entrance chamber to its direction of flow in the exit chamber may be in the range from 90° to 180°.

The beds in the entrance and exit chambers may be held in a fixed position by any desired means, such as supporting grates, which are known per se. Alternatively, it is possible to provide a bed of packings consisting preferably of relatively coarse packings also in the flow-deflecting space and such bed will then carry also the beds in the two other chambers.

The exit chamber is preferably wider than the entrance chamber so that the velocity of flow is lower in the exit chamber. It will be recommendable to design the exit chamber to have an inside cross-sectional area measured in a horizontal plane which is 1.5 times the corresponding area in the entrance chamber.

The packings which may be used may consist, e.g., of balls, Raschig rings, Pall rings, saddles or cylindrical bodies, or irregular packings may be used, such as are obtained by the crushing of naturally occurring materials. The packings may consist of honeycombs or flakes. Packings having different shapes may be used in the entrance chamber and in the exit chamber, although this is not essential. Balls which are 40 to 120 mm in diameter are particularly suitable for the entrance chamber, and balls which are 60 to 150 mm in diameter are particularly suitable for the exit chamber.

According to a further feature of the invention the raw gas which contains slag droplets is first conducted through a preseparator, in which the raw gas is deflected, and is subsequently conducted through the slag separator, which comprises the entrance chamber, flow-deflecting space, and exit chamber. A coarse separation is effected in the preseparator, by which part of the slag droplets are removed from the raw gas whereas the remaining slag droplets are removed form the raw gas in the slag separator. The preseparator may consist, e.g., of one or more cyclones or devices in which the raw gas is deflected one or more times so that slag droplets are separated by inertia.

The invention provides also an apparatus for carrying out the process described first hereinbefore. In that apparatus a preseparator may be disposed in the entrance chamber of the slag separator.

The fuels which may be used in the process may be solid or liquid. Coal, such as pulverized coal, or heavy fuel oil or waste materials are mentioned here only by way of example. The raw gas may be used, e.g., to produce steam and/or electrical energy in a power plant.

BRIEF DESCRIPTION OF THE DRAWINGS

Further features of the process and of the apparatus will be explained with reference to the drawing, in which.

DETAILED DESCRIPTION

Figure 1:
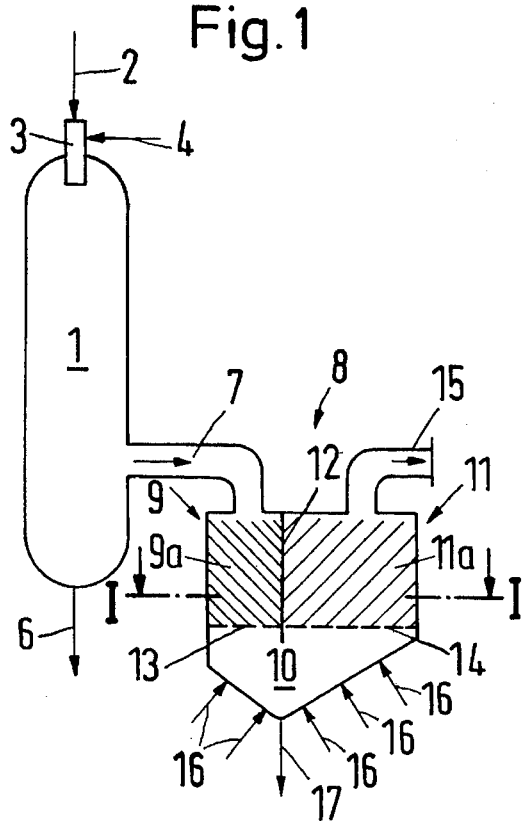
FIG. 1 is a schematic longitudinal sectional view showing a raw gas-producing plant, which is succeeded by a slag droplet separator.

A fuel is combusted at temperatures from 1100° to 1800° C. in the combustion chamber 1 of FIG. 1 to produce a raw gas and liquid slag. The fuel, e.g., a liquid or solid fuel, is supplied through line 2 to a burner, which is supplied with air through line 4. Liquid slag is collected in the lower portion of the combustion chamber 1 and is continuously or periodically withdrawn through a line 6. Means for withdrawing liquid slag have been described, e.g., in U.S. Pat. No. 4,487,612. The reaction in the chamber 1 may be effected in known manner by a combustion of the fuel or by a gasification resulting from a partial oxidation of the fuel.

Figure 2:
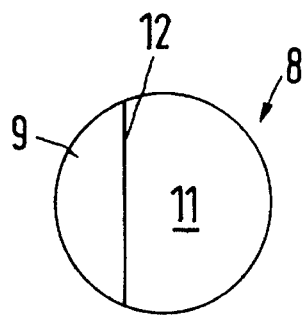
FIG. 2 is a sectional view taken on line I—I in FIG. 1 and showing the separator.

The raw gas which contains slag droplets and is at temperatures in the range from 1100° to 1800° C. leaves the combustion chamber 1 in line 7 and first flows into a slag separator 8. The separator comprises an entrance chamber 9, a flow-deflecting space 10, and an exit chamber 11, see also FIG. 2. A partition 12 is provided between the entrance chamber 9 and the exit chamber 11. The entrance chamber 9 contains on a grate 13 a first bed 9a of packings, and the exit chamber 11 contains on a grate 14 a second bed 11a of packings. The packings in the two chambers are indicated by hatched areas and may be the same or different. Said hatching has been omitted in FIG. 2.

The inside cross-sectional areas of the two chambers 9 and 11 and the shapes and particularly the size distribution of the packings are so selected that the effective velocity of flow of the combustion gas in the first bed 9a is higher than in the second bed 11a. As a result, the slag in the entrance chamber 9 is effectively entrained downwardly into the flow-deflecting space 10 and owing to the lower velocity in the exit chamber 11 an entraining of slag droplets by the raw gas in an upward direction and a discharge of slag droplets from the separator 8 through the outlet 15 is substantially avoided.

Those surfaces of the walls of the slag separator which are contacted by liquid slag may be protected by a refractory brick lining. Alternatively said walls may be made of steel and provided with integrated cooling tubes so that a layer of solidified slag will be formed on the wall to protect the latter. It will obviously also be possible to adopt both said variants in one slag separator at different locations.

It is important to ensure that slag which has undesirably solidified can be heated and re-liquefied. For this purpose, reheating burners 16 are provided, which are supplied with liquid or gaseous fuel in a manner known per se. By means of said burners a sufficiently high temperature may be maintained in the lower portion of the flow-deflecting space so that previously solidified slag can be re-liquefied. Liquid slag is removed through the tap 17. The design of such tap is apparent from the above-mentioned U.S. Pat. No. 4,487,612.

Figure 3:
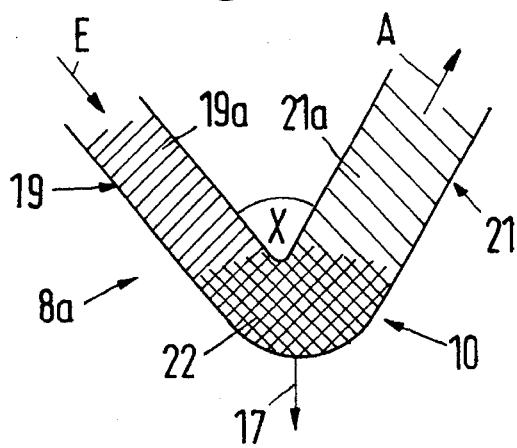
FIG. 3 is a longitudinal sectional view showing a second version of the slag separator.

The slag separator 8a which is schematically shown in FIG. 3 has the configuration of tubes which are interconnected in V-shape. Coming from the combustion chamber, not shown, the hot combustion gas flows in the entrance chamber 19 downwardly in an inclined direction indicated by the arrow E through a bed 19a of packings to enter the flow-deflecting space 10 and then rises in an inclined direction indicated by the arrow A through the exit chamber 21 and the bed 21a therein. The space 10 contains a cross-hatched bed 22, which consists of packings and serves as a support for the beds in the entrance and exit chambers. Liquid slag is tapped through the line 17. Reheating burners for maintaining the slag in a liquid state have been omitted in FIG. 3 for the sake of clearness.

Figure 6:
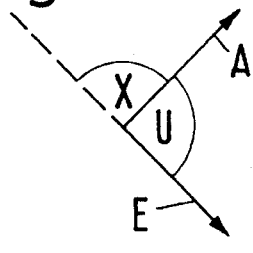
FIG. 6 is an illustration for an explanation of the definition of the deflection angle.

In the separator 8a of FIG. 3 the combustion gas flowing from the entrance chamber 19 to the exit chamber 21 is deflected through an angle U amounting to 180°- X. The deflection angle between the flow-indicating arrows E and A in the apparatus shown in FIG. 3 is indicated in FIG. 6. A deflection through 180° is effected in the slag separator 8 show in FIG. 1 because the flow is vertically downward in the entrance chamber 9 and vertically upward in the exit chamber 11.

Figure 4:
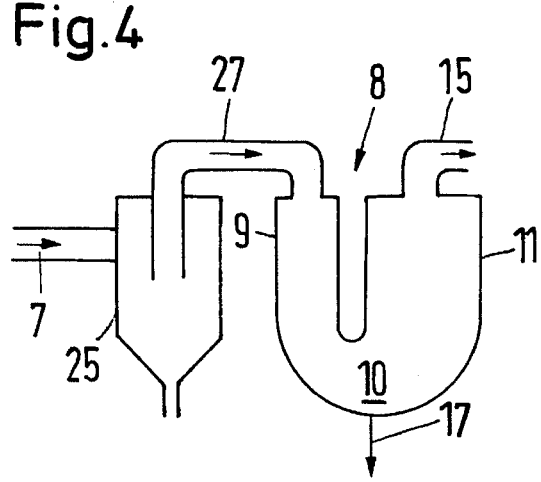
FIG. 4 is a longitudinal sectional view showing a third version of the slag separator provided with a preseparator.

In accordance with FIG. 4 the hot raw gas, which contains slag droplets, first flows through line 7 to a preseparator 25, which consists of a cyclone, in which part of the slag droplets are removed from the raw gas and are downwardly drained from the cyclone. The prepurified raw gas flows through the communicating duct 27 to the succeeding slag separator 8, in which the entrance chamber 9 and the exit chamber 11 consist each of a tube and have vertical cylindrical walls. The two chambers 9 and 11 are interconnected by the flow-deflecting space 10, which is provided at its lowermost point with a slag tap 17. Hatching in chambers 9 and 11 and in the space 10 has been omitted in FIG. 4 for the sake of simplicity. The embodiment shown in FIG. 4 may be modified in that the preseparator 25 is connected to a different slag separator, such as is shown in FIG. 1.

Figure 5:
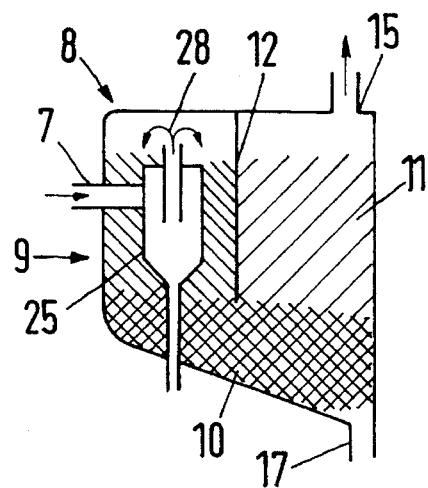
FIG. 5 is a longitudinal sectional view showing a fourth version of the slag separator provided with an integrated, preseparator.

The slag separator 8 shown in FIG. 5 comprises a preseparator 25, which is disposed in the entrance chamber 9 and receives the hot raw gas, which contains slag droplets and comes from line 7 and is to be prepurified. After a removal of part of the slag droplets the raw gas flows downwardly through the entrance chamber 9 and flows through the flow-deflecting space 10 and then upwardly through the exit chamber 11 to the gas outlet 15, as is indicated by the curved arrows 28. A partition 12 is provided between the chambers 9 and 11. Hatched areas indicate respective beds of packings. Liquid slag leaves the separator 8 through the tap 17. The embodiment shown in FIG. 5 may be modified in that the liquid slag separated in the cyclone 25 is conducted within the space 10 also to the slag tap 17.

Figure 7:
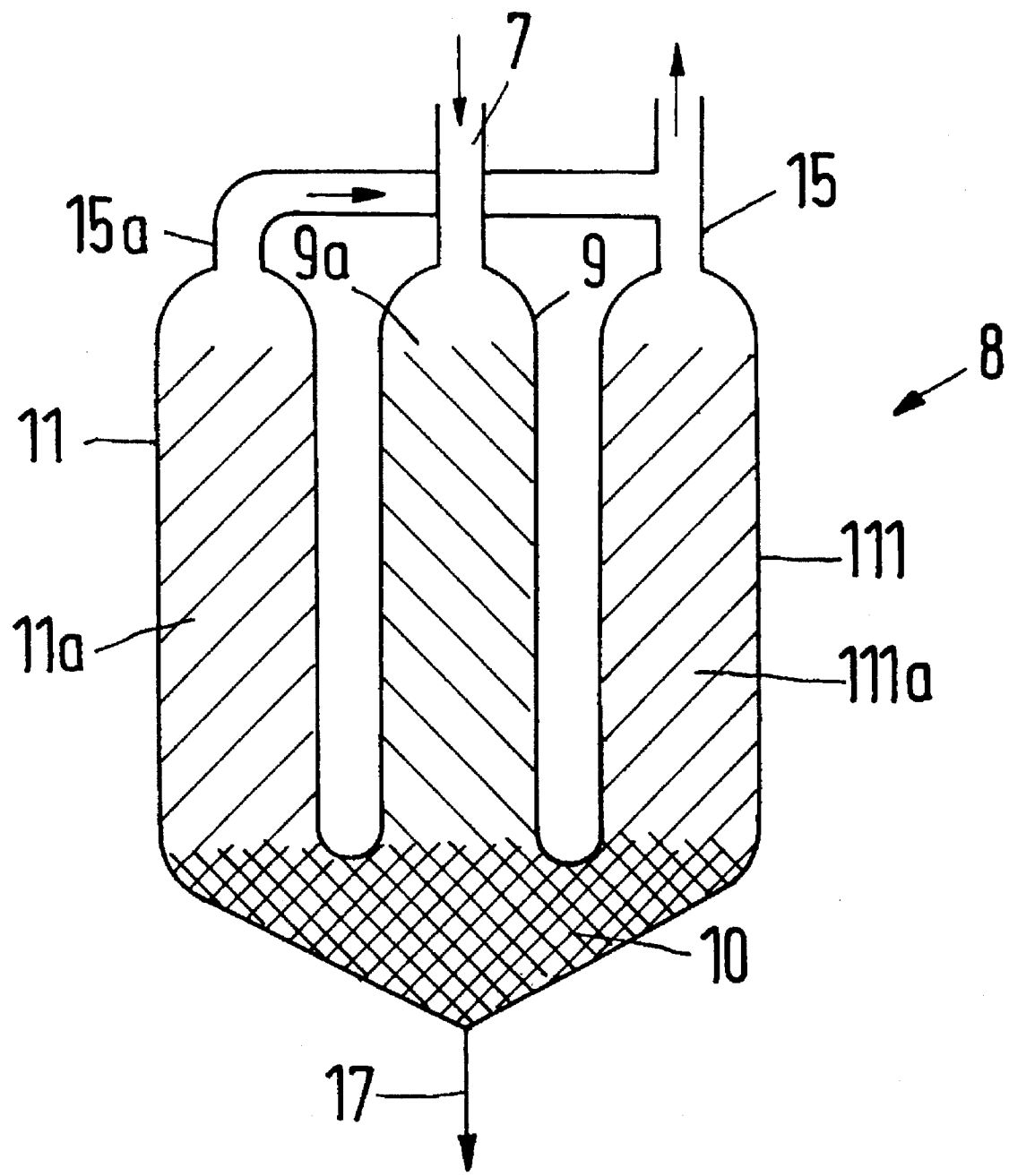
FIG. 7 is a longitudinal sectional view showing a fifth version of the slag separator.

In the slag separator 8 shown in FIG. 7 the entrance chamber 9 and the two exit chambers 11 and 111 are contained in cylindrical vessels, which are equal in diameter. The vessels communicate with each other through the flow-deflecting space 10. Liquid slag is tapped through line 17. Raw gas which contains slag droplets is supplied through line 7 to the entrance chamber 9 and flows downwardly through the first bed 9a and is distributed to the two exit chambers 11 and 111 and rises therein and leaves the exit chambers through the lines 15 and 15a.

EXAMPLE

In a combustion chamber, 91,000 kg pulverized hard coal are combusted per hour under a pressure of 16 bars and with an excess of air (air ratio 1.15). 969,200 sm$^3$ (sm$^3$=standard cubic meter) raw gas at a temperature of 1500° C. are thus produced. The hard coal has an ash content of 7% by weight, which by the combustion is converted to liquid slag. One-half of the slag formed in the combustion chamber is collected in a slag sump and is removed from there. The other half of the slag is entrained by the raw gas supplied to a slag separator 8 as shown in FIG. 7. Each of the 3 chambers 9, 11, and 111 is 5.5 m in inside diameter, and each of the beds 9a, 11a and 111a has a height of 6 m. All beds, also the one in the flow-deflecting space 10, consist of balls of $ZrO_2$, which in the chambers 9, 11 and 111 are 80 mm in diameter and in the space 10 are 120 mm in diameter.

In the entrance chamber 9 the raw gas flows downwardly to the space 10 at a velocity of 4.5 meters per second through the empty cross-section and is subsequently deflected and one-half of the gas then flows upwardly through each of the chambers 11 and 111 to the gas outlet. In each of the chambers 11 and 111 the velocity of the gas through the free cross-section amounts to 2.2 meters per second. The gas in the discharge lines 15 and 15a contains only 15 mg residual slag per sm$^3$ and may be supplied to a gas turbine for producing electrical energy. Liquid slag is withdrawn from the separator 8 at a rate of 3200 kg/h.

We claim:

1. A process for separating slag droplets from a raw gas which has been produced by the combustion or gasification of a solid or a liquid fuel and which is at temperatures in the range from 1100° to 1800° C. and under a pressure from 1 to 40 bars, comprising the steps of flowing the raw gas containing the slag droplets downwardly in an entrance chamber of a slag separator through a first bed of packings into a flow-deflecting space, and in said flow deflecting space deflecting the flow of the raw gas to flow upwardly in an exit chamber of the slag separator through a second bed of packings to a gas outlet, in which the effective velocity of flow of the combustion gas in said first bed of packings is 1.5 to 10 times the effective velocity of flow in said second bed of packings, and draining liquid slag from the flow-deflecting space.

2. A process according to claim 1, wherein the raw gas is deflected from its direction of flow in the entrance chamber to its direction of flow in the exit chamber by an angle of from 90° to 180°.

3. A process according to claim 1, wherein the flow-deflecting space contains a bed of packings.

4. A process according to claim 1, wherein said exit chamber has an inside cross-sectional area measured in a horizontal plane which is 1.5 to 10 times the cross-sectional area in the entrance chamber, measured in a horizontal plane.

5. A process according to claim 1, wherein the lower portion of the flow-deflecting space is heated.

6. A process according to claim 1, wherein the raw gas which contains slag droplets is first conducted through a preseparator, in which the raw gas is deflected, and is subsequently conducted into the entrance chamber of the slag separator.

7. A slag separator for separating slag droplets from a raw gas which has been produced by the combustion or gasification of solid or liquid fuels and is at temperatures in the range from 1100° to 1800° C. and under a pressure from 1 to 40 bars, comprising a preseparator, an entrance chamber, which contains a first bed of packings, said preseparator being disposed within said entrance chamber, at least one exit chamber, which is disposed beside the entrance chamber and contains a second bed of packings, and a flow-deflecting space interconnected between and disposed below said entrance chamber and exit chamber, said flow deflecting space being provided with a slag tap.

* * * * *